3,494,805
METHOD OF INHIBITING THE CORROSION OF TANTALUM BY LIQUID LITHIUM AT HIGH TEMPERATURES
James Y. N. Wang, Lockport, Ill., assignor to the United States of America as represented by the United States Atomic Energy Commission
No Drawing. Filed Mar. 22, 1967, Ser. No. 625,908
Int. Cl. C23f 7/00; C23c 11/06; B01j 1/20
U.S. Cl. 148—6.11      1 Claim

ABSTRACT OF THE DISCLOSURE

A method of inhibiting the corrosion of tantalum by liquid lithium at high temperatures by adding 0.15 to 1.5 atom percent silicon to the lithium.

CONTRACTUAL ORIGIN OF THE INVENTION

The invention described herein was made in the course of, or under, a contract with the United States Atomic Energy Commission.

BACKGROUND OF THE INVENTION

This invention relates to the reduction in corrosion of a metal used as a structural material in a liquid-metal-cooled reactor and more particularly to the inhibition of corrosion of tantalum by liquid lithium at high temperatures.

Lithium is in many ways the choice among all metals for use as the coolant in a liquid-metal-cooled reactor and in fact it has been selected as the coolant for the SNAP–50 reactor. Reasons for its choice include the widest liquid range of all of the alkali metals (180–1372° C.), low density, good thermal conductivity, low viscosity and an acceptable neutron absorption cross section. However, lithium is more corrosive than any other alkali metal. At temperatures above 1000° C. lithium forms intergranular compounds with tantalum which result in deep intergranular corrosion and microcracking of the tantalum.

SUMMARY OF THE INVENTION

The invention accordingly comprises a method of preventing intergranular corrosion and microcracking of tantalum when in contact with lithium at temperatures above 1000° C. This is accomplished by adding between 0.15 and 1.5 atom percent silicon to the lithium. This small amount forms a $Ta_2Si$ diffusion barrier which prevents further corrosion and eliminates microcracking.

DESCRIPTION OF THE PREFERRED EMBODIMENT

A number of experiments were carried out to show the advantages of the present invention and to delineate the metes and bounds of the invention. These tests were carried out by introducing 3 to 4 grams of lithium into capsules formed of high purity tantalum, adding amounts of silicon to the lithium ranging up to 3 atom percent and heating the capsules at 1200° C. Specific experiments were made using pure lithium containing 0.15, 0.5, 1.5, and 3 atom percent silicon. Initial experiments were carried out by heating a capsule which was 4 inches long by ½ inch I.D. and ¾ inch O.D. for 7 days at 1200° C., while subsequent experiments were carried out in this capsule for 15 days. The capsule contained a cap which was electro-beam sealed to the body of the capsule. A wafer of high purity tantalum about ½ inch by ¼ inch in size was placed in the capsule in contact with the lithium. While the capsule was subjected to visual inspection at the completion of each test, the wafer was subjected to more detailed examination.

There was essentially no detectable corrosion of tantalum exposed to lithium containing any of the proportions of silicon specified. However, it was also observed that no increase in protection is obtained by adding more than 1.5 atom percent silicon. Thus practical limits on the amount of silicon to be added are 0.15 atom percent and 1.5 atom percent.

Under the same test conditions, however, tantalum contacted with pure lithium was severely corroded, suffering severe penetration to a maximum depth of approximately 340 microns within seven days. Thus the utility of the invention has been established.

Microhardness measurements taken from a transverse section of the tantalum wafer exposed to 1.5 atom percent silicon showed a sharp increase in hardness in a surface diffusion layer (approximately $1500\mu$ thick) between a reaction layer and the base metal. The increase in hardness is attributed to silicon deposition.

Microprobe study of the surface reaction layer indicates that it is about $4\mu$ thick. X-ray diffraction analysis revealed that the lattice constants of the reaction layer closely correspond to the known compound $Ta_2Si$. This compound contains 7.2 weight percent silicon, a value in good agreement with the silicon concentration of the exposed tantalum surface, as determined by microprobe analysis. The observed layer is in fact thermodynamically stable in the test environment and is believed to be responsible for the corrosion resistance of the tantalum.

Other compounds which are known deoxidizing agents for lithium were also tested. These include yttrium and titanium. In either case was the corrosion of tantalum reduced to a satisfactory level.

The embodiments of the invention in which an exclusive property or privilege is claimed are defined as follows:

1. A method of inhibiting the corrosion of tantalum by liquid lithium at high temperatures comprising adding 0.15 to 1.5 atom percent silicon to the lithium and contacting the tantalum with the lithium at temperatures above 1000° C.

References Cited

UNITED STATES PATENTS

| | | | |
|---|---|---|---|
| 3,002,852 | 10/1961 | Bowman et al. | 117—135.1 X |
| 3,073,720 | 1/1963 | Mets | 117—131 X |
| 3,086,886 | 4/1963 | Kieffer et al. | 117—114 X |
| 3,184,292 | 5/1965 | Argyriades et al. | 117—114 X |
| 3,186,865 | 6/1965 | Page | 117—131 X |
| 3,413,142 | 11/1968 | Lemke | 117—131 X |

RALPH S. KENDALL, Primary Examiner

U.S. Cl. X.R.

117—114, 135.1; 176—92